United States Patent [19]

Kubomoto

[11] Patent Number: 4,984,427

[45] Date of Patent: Jan. 15, 1991

[54] CONTROL CIRCUIT FOR HYDRAULIC ACTUATOR

[75] Inventor: Wataru Kubomoto, Hiroshima, Japan

[73] Assignee: Kabushiki Kaisha Kobe Seiko Sho, Kobe, Japan

[21] Appl. No.: 401,768

[22] Filed: Sep. 1, 1989

[51] Int. Cl.[5] .......... F16H 39/46

[52] U.S. Cl. .......... 60/428; 60/486; 91/29; 91/461

[58] Field of Search .......... 60/428, 486; 91/6, 29, 91/461

[56] References Cited

U.S. PATENT DOCUMENTS

| | | | |
|---|---|---|---|
| 3,868,821 | 3/1975 | Ratliff | 60/486 |
| 3,987,626 | 10/1976 | Bianchetta | 60/486 |
| 3,990,236 | 11/1976 | Johnson | 60/428 |
| 4,086,767 | 5/1978 | Byers, Jr. | 60/486 |
| 4,367,624 | 1/1983 | Ogata et al. | 91/6 |
| 4,405,287 | 9/1983 | Kuchenbecker et al. | 60/486 |
| 4,476,898 | 10/1984 | Krieger et al. | 91/461 |
| 4,528,892 | 7/1985 | Okabe et al. | 91/6 |
| 4,534,268 | 8/1985 | Yagyu et al. | 91/6 |
| 4,683,802 | 8/1987 | Prokop et al. | 91/516 |
| 4,753,158 | 6/1988 | Hirata et al. | 91/461 |

*Primary Examiner*—Ronald C. Capossela

*Attorney, Agent, or Firm*—Oblon, Spivak, McClelland, Maier & Neustadt

[57] ABSTRACT

A control circuit for a hydraulic actuator which allows the hydraulic actuator to be operated readily without much skill and at a suitable speed in accordance with a load applied thereto. The control circuit includes a change-over valve provided intermediately of a pilot pipe line communicating with a pilot oil chamber of a hydraulic change-over valve which belongs to one of a pair of hydraulic change-over valve sets of a hydraulic operating circuit for the hydraulic actuator. The change-over valve is normally urged to a position wherein the pilot oil chamber of the hydraulic change-over valve is communicated with a tank, but is changed over, when a hydraulic pressure higher than a predetermined value acts upon a pilot oil chamber of the change-over valve, to another position in which the pilot oil chamber of the hydraulic change-over valve is communicated with the pilot pipe line. A branch pipe line branches from a pipe line for discharge oil under pressure of a hydraulic pump provided for supplying oil under pressure to the other hydraulic change-over valve set and is connected to the pilot oil chamber of the change-over valve.

2 Claims, 3 Drawing Sheets

CONTROL CIRCUIT FOR HYDRAULIC ACTUATOR

BACKGROUND OF THE INVENTION

1. Field of the Invention

This invention relates to a control circuit for a hydraulic actuator wherein a pair of hydraulic change-over valves which individually are part of two hydraulic change-over valve sets are operated to cause oil under pressure obtained from them to join each other to operate the hydraulic actuator.

2. Description of the Prior Art

Various methods have been conventionally employed for supplying the entire amounts of discharge pressure oil of two hydraulic pumps, in some cases, in a converging relationship to a single hydraulic actuator to raise the operating speed of the hydraulic actuator. Such methods include a method wherein discharge oil under pressure flows from two hydraulic pumps and are introduced to two independent sets of hydraulic change-over valves to change over two hydraulic change-over valves belonging to the individual hydraulic change-over valve sets at a time so as to obtain a converging oil under pressure flow by which a single hydraulic actuator is operated, or another method wherein discharge oil under pressure from a hydraulic pump which is supplied to one of two hydraulic change-over valve sets is supplied simulataneously to a hydraulic change-over valve belonging to the other hydraulic change-over valve set so as to obtain a large capacity to operate a hydraulic actuator with oil under pressure from the hydraulic change-over valve.

FIG. 2 is a hydraulic circuit diagram illustrating the former method where oil under pressure flows from two hydraulic cylinders for an arm of a hydraulic shovel join each other.

Referring to FIG. 2, the hydraulic circuit shown includes first and second hydraulic pumps 2 and 3 and a pilot pump 4 which are all driven by an engine 1 to draw working oil out of a tank 19 and each provide appropriate discharge oil under pressure by action of a relief valve. Thus, the first hydraulic pump 2 supplies discharge oil under pressure to a hydraulic change-over valve set A consisting of hydraulic change-over valves 8, 9, 10 and 11 for an actuator by way of a pipe line 5; the second hydraulic pump 3 supplies discharge oil under pressure to another hydraulic change-over valve set B consisting of hydraulic change-over valves 12, 13, 14 and 15 for operation of an actuator by way of another pipe line 6; and the pilot pump 4 supplies discharge oil under pressure pressure oil to an operation system including a pilot valve 16 by way of a further pipe line 7. If the pilot valve 16 is operated and consequently a pressure signal is generated simulataneously in pilot oil chambers of the hydraulic change-over valves 11 and 15, then the hydraulic change-over valves 11 and 15 are changed over so that discharge oil under pressure of the first hydraulic pump 2 now flows into the hydraulic change-over valve set A by way of the pipe line 5 and then further into a pipe line 20 or 21 by way of a changed over path of the hydraulic change-over valve 11 while discharge oil under pressure of the second hydraulic pump 3 flows into the hydraulic change-over valve set B by way of the pipe line 6 and then into a pipe line 22 or 23 by way of a changed over path of the hydraulic change-over valve 15. Here, the pipe lines 20 and 21 are connected intermediately thereof to the pipe lines 22 and 23 and then to a head side oil chamber and a rod side oil chamber of a hydraulic cylinder 17 for the arm of the hydraulic shovel, respectively. Accordingly, the discharge oil pressure of the first hydraulic pump 2 and the discharge oil under pressure of the second hydraulic pump 3 are added to each other to operate the hydraulic cylinder 17.

As should be understood, change-over valves 8 to 15 are directional control valves with a flow rate regulating function, and valve 8 is a control valve for a hydraulic motor serving as a running actuator. Valve 9 is a control valve for the joining of an actuator for a boom and valve 10 operates as a control valve for an actuator for the swinging motion. Valve 11 is a control valve for an actuator for an arm and valve 12 serves as a control valve for the joining of a hydraulic motor serving as a hydraulic actuator for running operation. Valve 13 is a control valve for the actuator for the boom while valve 14 operates as a control valve for an actuator for a bucket and valve 15 is a control valve for joining of the actuator for the arm.

The arm and the boom are required to have different operating speeds depending upon the kinds of excavating operations being performed. When a high speed is required, oil under pressure from the pump 2 and oil under pressure from the pump 3 are joined together and supplied to the actuators. In FIG. 2, only the actuator 17 for actuating the arm b is shown while the other actuators are omitted. As can be seen from FIG. 2, the change-over valve set B includes, on the upstream side of the control valve 15 for joining of the arm actuator, control valve 13 for the boom actuator and control valve 14 for the bucket actuator, and oil under pressure is supplied from the hydraulic pump 3 commonly to the control valves 13 and 14.

Control valves 11 and 15 are controlled simultaneously by a single signal from a remote control valve 16 of the pilot type.

In the case of operation as seen in FIG. 3, the load is low, but fine operational control is required. In particular, manual operations for moving the arm, boom and bucket simultaneously and slowly are required. Thus, if the pilot remote control valve 16 is manually operated to control the control valves 11 and 15 for the arm actuator to reduce the flow rate of pressurized oil to flow therethrough, then excessive pressurized oil will flow into the control valve 13 for the boom actuator and the control valve 14 for the bucket actuator located on the upstream side of the control valves 11 and 15, while wil change the operating speeds of the boom and the bucket so as to deteriorate or disable fine control of them.

When it is intended to perform an operation by use of the hydraulic cylinder of a converging hydraulic circuit as described above, for example, when it is intended to operate an arm b of such a hydraulic shovel as shown in FIG. 3 to perform a shaping operation of a vertical or inclined surface d or a light excavating operation such as leveling of the ground, an operation lever for operating the arm b must be operated in a delicate manner and at a speed conforming to a speed of movement of a boom a or a bucket c or a turning motion. Accordingly, operability is low, and much skill is required for operation.

SUMMARY OF THE INVENTION

It is an object of the present invention to provide a control circuit for a hydraulic actuator which allows the hydraulic actuator to be operated at a suitable speed in accordance with a load applied thereto.

It is another object of the present invention to provide a control circuit for a hydraulic actuator by which the hydraulic actuator can be operated readily the operator having much skill.

In order to attain the object of the invention, according to the present invention, there is provided a control circuit for a hydraulic actuator which is operated by a hydraulic operating circuit wherein flows of oil under pressure of a pair of hydraulic pumps are suplplied to a pair of independent dedicated hydraulic change-over valve sets and hydraulic change-over valves of the hydraulic pilot type which belong to the different hydraulic change-over valve sets are changed over by a single signal pressure to obtain pressure oil flows which are then caused to join each other to operate the hydraulic actuator, the control circuit comprising a change-over valve provided intermediately of a pilot pipe line communicating with a pilot oil chamber of the hydraulic change-over valve which belongs to one of the hydraulic change-over valve sets, the change-over valve being normally urged to a position wherein the pilot oil chamber of the hydraulic change-over vavle is communicated with a tank, the change-over valve being changed over, when a hydraulic pressure highr than a predetermined value acts upon a pilot oil chamber of the change-over valve, to another position in which the pilot oil chamber of the hydraulic change-over valve is communicated with the pilot pipe line, and a branch pipe line which branches from a pipe line for discharging oil under pressure of the hydraulic pump provided for supplying oil under pressure to the other hydraulic change-over valve set and is connected to the pilot oil chamber of the change-over valve.

When an operation lever is operated so as to cause signal oil under pressure oil from a pilot valve to act upon the pilot oil chambers of the hydraulic change-over valves which individually belong to the pair of hydraulic change-over valve sets, if the load to the hydraulic actuator or cylinder is low and consequently the operating pressure is lower than a predetermined value, then the pressure acting upon the pilot oil chamber of the change-over valve is low, and consequently, the change-over valve maintains its position wherein the pilot pipe line connecting to the pilot oil chamber of the hydraulic change-over valve which belongs to the one hydraulic change-over valve set is communicated with the tank. As a result, the hydraulic change-over valves are not changed over, and accordingly, only discharge oil under pressure of the hydraulic pump which flows into the other hydraulic change-over valve set is supplied to the hydraulic cylinder.

If the load to the hydraulic cylinder is increased from this condition until the operating pressure thereof exceeds the predetermined value, then the change-over valve is changed over against the biasing force of the spring, and consequently, the signal pressure oil from the pilot valve is now introduced into the pilot oil chanber of the hydraulic change-over valve which belongs to the one hydraulic change-over valve set. As a result, the hydraulic change-over valve is changed over, and consequently, oil under pressure flows from the hydraulic change-over valves which belong to both of the hydraulic change-over valve sets are caused to join each other to operate the hydraulic cylinder.

With the control circuit, although the hydraulic actuator is operated by convergent oil under pressure from the plurality of pumps, when the load to the hydraulic actuator is low and the hydraulic actuator is required to perform a delicate operation, the speed of operation of the hydraulic actuator is automatically made slow, and consequently, the operability is improved. Accordingly, even an unskilled operator can readily perform a fine control of the hydraulic actuator. To the contrary, if heavy load operation occurs, then an efficient speed of operation is automatically attained. Besides, the construction of the hydraulic circuit is simple.

The above and other objects, features and advantages of the present invention will become apparent from the following description of the appended claims, taken in conjunction with the accompanying drawings.

DESCRIPTION OF THE PREFERRED EMBODIMENT

Figure 1:
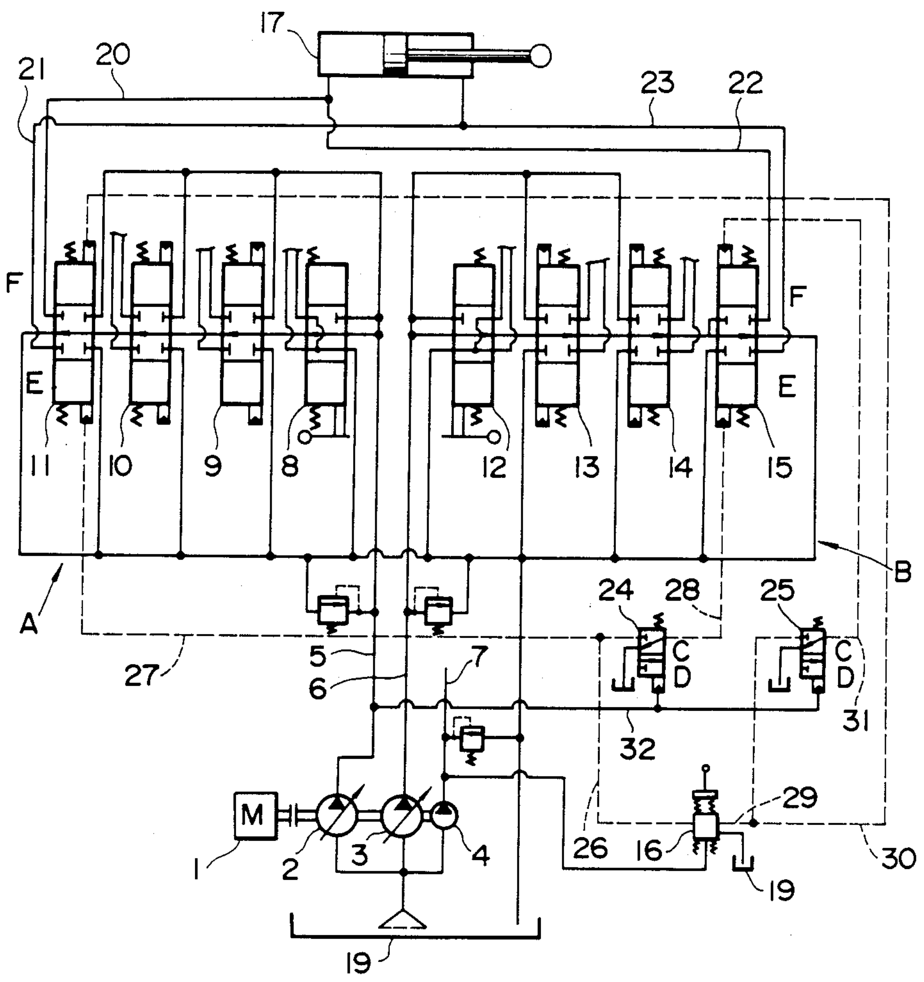
FIG. 1 is a hydraulic circuit diagram of a control circuit for a hydraulic actuator which is applied to a hydraulic shovel showing a preferred embodiment of the present invention.
Figure 2:
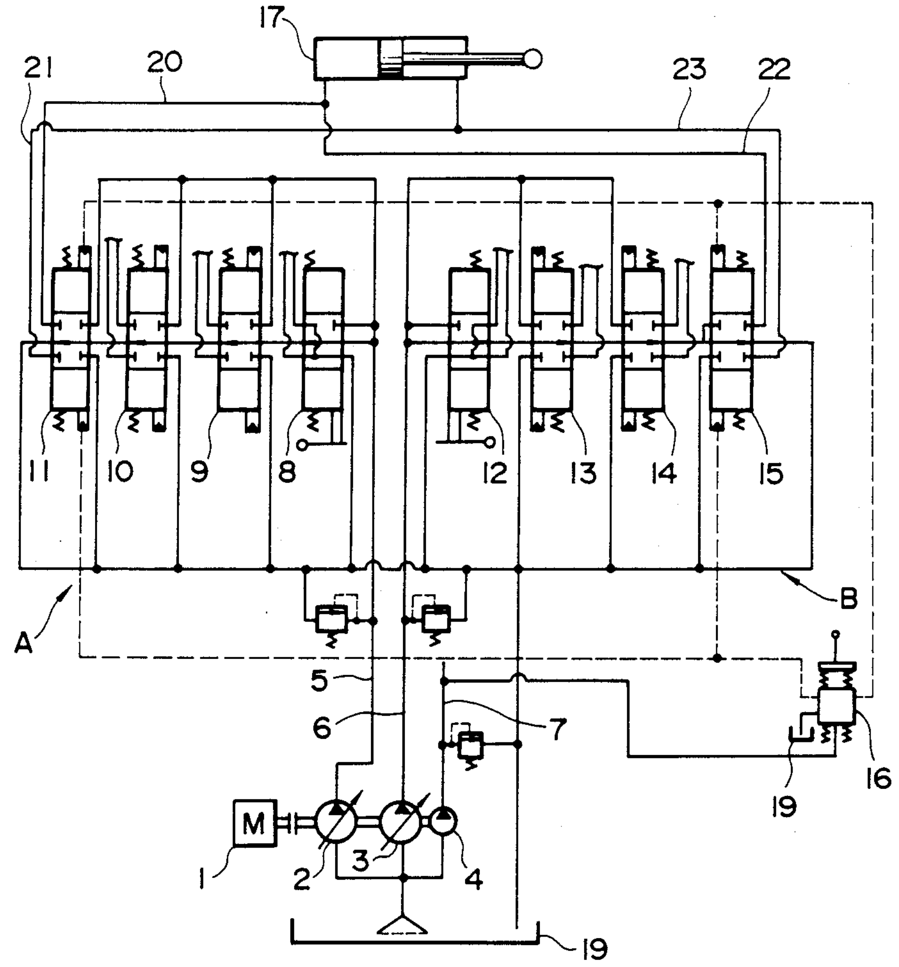
FIG. 2 PRIOR ART
FIG. 2 is a hydraulic circuit diagram showing a conventional hydraulic shovel.
Figure 3:
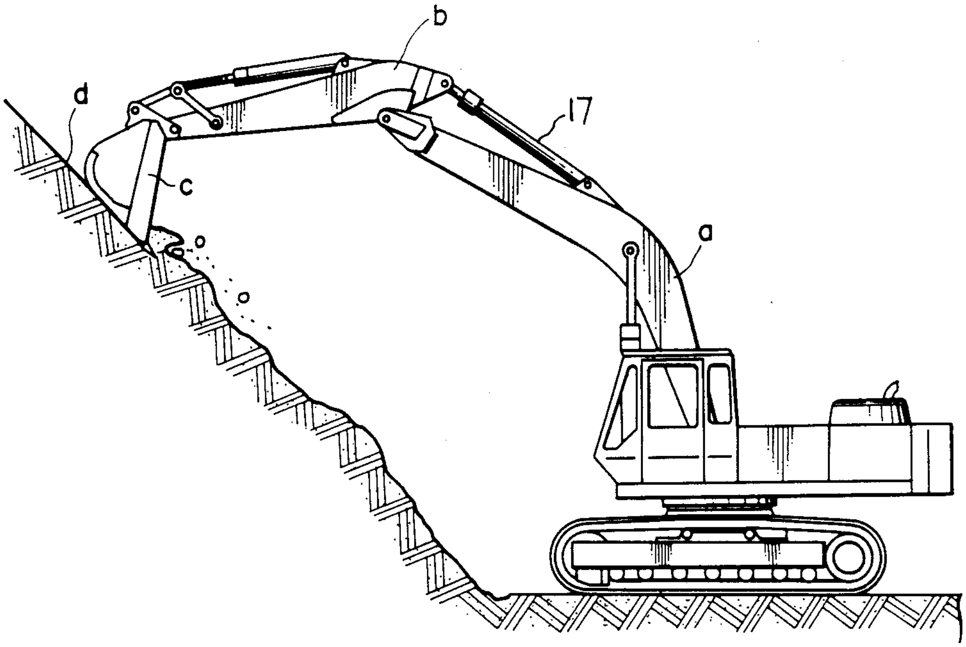
FIG. 3 PRIOR ART
FIG. 3 is a side elevational view of the conventional hydraulic shovel during a shaping operation for ground which is inclined.

Referring to FIG. 1, there is shown a hydraulic circuit according to the present invention which is applied to a hydraulic cylinder for an arm of a hydraulic shovel. The hydraulic circuit shown is constructed such that discharge oil under pressure which flows from two hydraulic pumps are individually supplied to two independent dedicated hydraulic change-over valve sets A and B.

The hydraulic circuit shown includes an engine 1, first and second hydraulic pumps 2 and 3, a pilot pump 4, pipe lines 5, 6 and 7, hydraulic change-over valves 8, 9, 10 and 11 which belong to hydraulic change-over valve set A and to which discharge oil under pressure of the first hydraulic pump 2 is supplied by way of the pipe line 5, and hydraulic change-over valves 12, 13, 14 and 15 which belong to hydraulic change-over valve set B and to which discharge oil under pressure of the second hydraulic pump 3 is supplied by way of the pipe line 6. Each of the hydraulic change-over valves, except particular ones for running of the hydraulic shovel, has a pilot oil chamber and is operated by a signal pressure from a pilot valve. A pilot valve 16 is provided for the hydraulic change-over valves 11 and 15 while pilot valves for the other hydraulic change-over valves are omitted in FIG. 1. The hydraulic circuit further includes a hydraulic cylinder 17 for an arm of the shovel. The hydraulic cylinder 17 is operated by the hydraulic change-over valve 11 or 15. In particular, pipe lines 20 and 21 extend between the hydraulic change-over valve 11 and the hydraulic cylinder 17 while pipe lines 22 and 23 extend between the hydraulic change-over valve 15 and the hydraulic cylinder 17, and the pipe lines 20 and 22 join or converge with each other intermediately thereof and are connected to a head side oil chamber of the hydraulic cylinder 17 while the pipe lines 21 and 23 converge with each other and are connected to a rod side oil chamber of the hydraulic cylinder 17.

The hydraulic circuit further includes a pair of change-over valves 24 and 25 which are each normally held at a position C under the biasing force of a spring. However, if the pressure of discharge oil under pressure of the first hydraulic pump 2 which flows into the change-over valves 24 and 25 way of a pipe line 32 branching from the pipe line 5 is raised so as to be higher than a prescribed value, then the change-over valves 24 and 25 are changed over from the position C to another position D. When the change-over valves 24 and 25 are held at the position C, pilot pipe lines 28 and 31 communicating with pilot oil chambers E and F of the hydraulic change-over valve 15 are communicated with the tank 19, but when the change-over valves 24 and 25 are at the position D, a branch pipe line from the pilot pipe line 26 is communicated with the pilot pipe line 28 while another branch line of the pilot line 29 is communicated with the pilot pipe line 31. It is to be noted that the pilot oil chambers E and F of the hydraulic change-over valve 11 are connected directly to the pilot valve 16 by way of the pilot pipe lines 26 and 27 and the pilot pipe lines 29 and 30, respectively, irrespective of the changed over positions of the change-over valves 24 and 25.

Described in greater detail, the present invention relates to a hydraulic circuit for a hydraulic shovel which is effective when fine operation is required.

The most characteristic construction is the provision of the change-over valves 24 and 25 located intermediately in the pilot pipe lines (26 to 28 and 29 to 31) which interconnect the pilot oil chamber E of the control valve 15 for joining the pilot remote control valve 16.

Since the change-over valves 24 and 25 normally interrupt a pilot signal from the remote control valve 16, the joining control valve 15 does not operate.

The arm is controlled only by the control valve 11 of the change-over valve set A, and only pressurized oil from the hydraulic pump 2 flows through the control valve 11.

Accordingly, pressurized oil from the hydraulic pump 3 flows only through the control valve 13 for the boom actuator and the control valve 14 for the bucket actuator. Therefore, the control valves 13 and 14 are not influenced by operation of the arm any more, which allows fine control of the boom and the bucket.

On the other hand, in the case of operation wherein a high load is applied to the arm, a high flow rate by the joining of pressure oil flows is required.

In this instance, the discharging pressure of the hydraulic pump 2 is raised. Thus, the discharging pressure is extracted by means of the branch pipe line 32 and utilized as a pilot pressure to change over the change-over valves 24 and 25.

Operation of the control circuit of the present invention having such a construction as described above will now be described.

If it is assumed that an operation lever of the pilot valve 16 is operated so that a pilot pressure is generated on the side of the pilot pipe lines 26 and 27 and the pilot pressure acts upon a pilot oil chamber for operating the hydraulic change-over valve 11 to a side E so that the hydraulic change-over valve 11 is changed over from its neutral position to the position E. Consequently, discharge oil under pressure of the first hydraulic pump 2 which flows into the hydraulic change-over valve set A flows into an oil chamber of the hydraulic cylinder 17 by way of a changed over path of the hydraulic change-over valve 11 and the pipe line 20 or 21 to operate the hydraulic cylinder 17. In this instance, if the load then is low, the pressure within the pipe line 20 or 21, that is , within the pipe line 5 is low, and consequently, the pressure acting upon the pilot oil chamber of the change-over valve 24 by way of the pipe line 32 is not sufficiently high so as to cause changing over of the change-over valve 24, and the change-over valve C maintains its position C. Consequently, the pilot oil chamber E of the hydraulic change-over valve 15 remains communicated with the tank 19, and the hydraulic change-over 15 maintains its neutral position.

If the load applied to the hydraulic cylinder 17 increases from this condition, the pressure in the pipe line 20 or 21 rises, and simultaneously the respective pressures in the pipe lines 5 and 32 also rises. Then, if the pressure exceeds the prescribed value or threshold level, then the change-over valve 24 is changed over from the position C to the position D.

As a result, the branch pipe line of the pilot pipe line 26 is communicated with the pilot oil chamber of the hydraulic change-over valve 15 on the side E by way of a D position path of the change-over valve 24 and the pilot pipe line 28, and consequently, the hydraulic change-over valve 15 s changed over so that discharge pressure oil of the second hydraulic pump 3 which flows into the hydraulic change-over valve set B by way of the pipe line 6 is communicated with the pipe line 22 or 23, and either pressure oil of the pipe line 22 converges with pressure oil of the pipe line 20 described above or pressure oil of the pipe line 23 converges with pressue oil of the pipe line 21, and then flows into the oil chamber of the hydraulic cylinder 17. In this instance, the hydraulic cylinder is operated by the total amount of discharge oil under pressure of the first and second hydraulic pumps 2 and 3.

Subsequently, if the operation lever of the pilot valve 16 is operated in the opposite direction, then a pilot pressure is generated in the pilot pipe line 29 and acts upon the pilot oil chamber F of the hydraulic change-over valve 11 by way of the pilot pipe lines 29 and 30 and also upon the pilot oil chamber F of the hydraulic change-over valve 15 by way of the branch circuit of the pilot pipe line 29, the change-over valve 25 and the pilot pipe line 31. Consequently, the hydraulic change-over valves 11 and 15 are changed over in a reverse fashion by a similar function as described above to thus operate the hydraulic cylinder 17 in the reverse direction.

While in the embodiment described above only control of the hydraulic cylinder for an arm of a hydraulic shovel is described, the present invention is not limited to this and can be applied, for example, to an actuator of a hydraulic motor or the like. Further, the present invention is not limited to a combination of two hydraulic pumps and two corresponding hydraulic change-over valve sets, and where a greater number of hydraulic pumps and corresponding hydraulic change-over valve sets are combined, the number of change-over valves may be increased or various change-over valves having different preset values of threshold pressures at which the change-over valves are changed over may be involved in combination so that the speeds of the hydraulic actuators such as hydraulic cylinders or hydraulic motors can be changed in accordance with load pressures thereto.

Having now fully described the invention, it will be apparent to one of ordinary skill in the art that many changes and modifications can be made thereto without departing from the spirit and scope of the invention as set forth herein.

What is claimed is:

1. A control circuit for a hydraulic actuator which is operated by a hydraulic operating circuit wherein discharge pressure oil flows of a pair of hydraulic pumps are supplied to a pair of independent dedicated hydraulic change-over valve sets and hydraulic changeovers valves of a hydraulic pilot type which form a part of the different change-over valve sets are changed over by a single pressure to obtain oil pressure flows which are then caused to join each other to operate said hydraulic actuator, wherein said control circuit comprises:

change-over valve means provided along pilot pipe lines communicating with a pilot oil chamber of the hydraulic change-over valve which forms a part of one of said hydraulic change-over valve sets;

means for normally biasing said change-over valve to a position wherein said pilot oil chamber of the hydraulic change-over valve is communicated with a tank;

means for changing over said change-over valve means, when a hydraulic pressure higher than a predetermined value acts upon the pilot oil chamber of said change-over valve, to another position in which said hydraulic oil chamber of the hydraulic change-over valve is communicated with said pilot pipe lines;

and a branch pipe line which braches from a pipe line for discharge oil under pressure of the hydraulic pump provided for supplying oil under pressure to the other hydraulic change-over valve set and which is connected to said pilot oil chamber of said change-over valve.

2. A control circuit as set forth in claim 1, wherein said change-over valve is provided at an intermediate position of said pilot pipe line.

* * * * *